(12) United States Patent
Yoshimitsu

(10) Patent No.: US 7,885,054 B2
(45) Date of Patent: Feb. 8, 2011

(54) SOLID ELECTROLYTIC CAPACITOR

(75) Inventor: Satoru Yoshimitsu, Saga (JP)

(73) Assignees: Sanyo Electric Co., Ltd., Moriguchi-shi (JP); Saga Sanyo Industries Co., Ltd., Saga (JP)

( * ) Notice: Subject to any disclaimer, the term of this patent is extended or adjusted under 35 U.S.C. 154(b) by 397 days.

(21) Appl. No.: 12/096,688

(22) PCT Filed: Nov. 29, 2006

(86) PCT No.: PCT/JP2006/323752

§ 371 (c)(1),
(2), (4) Date: Jun. 9, 2008

(87) PCT Pub. No.: WO2007/066545

PCT Pub. Date: Jun. 14, 2007

(65) Prior Publication Data

US 2009/0290291 A1 Nov. 26, 2009

(30) Foreign Application Priority Data

Dec. 9, 2005 (JP) ............................. 2005-355731

(51) Int. Cl.
*H01G 9/04* (2006.01)
(52) U.S. Cl. .................. 361/528; 361/516; 361/519; 361/523; 361/525
(58) Field of Classification Search .............. 361/527, 361/516–519, 523–525, 528–529, 530–541, 361/508–512; 29/25.01, 25.03
See application file for complete search history.

(56) References Cited

U.S. PATENT DOCUMENTS

| | | | | |
|---|---|---|---|---|
| 5,914,852 A | * | 6/1999 | Hatanaka et al. | ............ 361/523 |
| 6,052,273 A | * | 4/2000 | Inoue et al. | ................. 361/523 |
| 6,208,503 B1 | * | 3/2001 | Shimada et al. | ............. 361/523 |
| 6,515,847 B1 | * | 2/2003 | Naraya | ........................ 361/523 |
| 7,068,493 B2 | * | 6/2006 | Iwaida et al. | ................ 361/502 |
| 7,099,145 B2 | * | 8/2006 | Kobayashi et al. | .......... 361/523 |
| 7,106,575 B2 | * | 9/2006 | Taketani et al. | ............. 361/528 |

FOREIGN PATENT DOCUMENTS

| | | |
|---|---|---|
| JP | 2002-299181 A | 10/2002 |
| JP | 2004-221512 A | 8/2004 |
| JP | 2005-109275 A | 4/2005 |

OTHER PUBLICATIONS

International Search Report of PCT/JP2006/323752, date of mailing Feb. 21, 2007.
Chinese Office Action dated Sep. 7, 2010, issued in corresponding Chinese Patent Application No. 200680045885.0.

* cited by examiner

*Primary Examiner*—Nguyen T Ha
(74) *Attorney, Agent, or Firm*—Westerman, Hattori, Daniels & Adrian, LLP

(57) ABSTRACT

A solid electrolytic capacitor is configured to include a wound capacitor element that has an anode (2), a cathode (3) composed of aluminum, a hard coating film (28) formed on a surface of the cathode (3), a separator (4b), and a solid electrolyte layer, and is also configured so that the solid electrolytic capacitor further includes an intermediate layer 18 formed between the cathode (3) and the hard coating film (28), the hard coating film (28) is composed of a compound of aluminum, titanium, and at least one nonmetallic element, and the intermediate layer (18) contains at least one element selected from the group of metallic elements consisting of aluminum and titanium. It is particularly preferable that the hardness of the substance that constitutes the intermediate layer (18) of the solid electrolytic capacitor be less than the hardness of the substance that constitutes the hard coating film (28).

11 Claims, 3 Drawing Sheets

SOLID ELECTROLYTIC CAPACITOR

TECHNICAL FIELD OF THE INVENTION

The present invention relates to a solid electrolytic capacitor comprising a wound capacitor element.

BACKGROUND ART

Electrolytic capacitors that make use of a valve metal, such as tantalum (Ta), niobium (Nb), and aluminum (Al), as an electrode have been known. The electrolytic capacitors have been widely used because they are small in size yet achieve a large capacity in comparison with other types of capacitors. Among the electrolytic capacitors, wound-type solid electrolytic capacitors that employ, as the electrolyte, polypyrrole-based, polythiophene-based, polyfuran-based, or polyaniline-based conductive polymer, or a TCNQ (7,7,8,8,-tetracyanoquinodimethane) complex salt, for example, have drawn attention.

It has been required to further increase the capacity of the solid electrolytic capacitors without increasing the size. In order to achieve this, a method of increasing the capacitance by forming a coating film made of a metal nitride such as titanium nitride (TiN) on the surface of the cathode has been proposed.

Here, a wound capacitor element in a conventional wound-type solid electrolytic capacitor will be described below. FIG. 5 is a schematic perspective view illustrating one example of the structure of the wound capacitor element in a conventional wound-type aluminum solid electrolytic capacitor. FIG. 5 shows the wound capacitor element whose trailing end is unwound, for clearly illustrating the stack structure in the capacitor element.

The capacitor element 1 comprises: an aluminum foil serving as an anode 2, which has been subjected to an etching process (electrolytic polishing process) and a formation process; an aluminum foil serving as a cathode 3, which has been subjected to an etching process; a TiN deposition film serving as a hard coating film 8; separator papers 4a and 4b for preventing the aluminum foil 2 and the aluminum foil 3 from making contact with each other; and polythiophene-based conductive polymer layers (not shown) each serving as a solid electrolyte layer, which are formed between the aluminum foil 2 and the separator paper 4b and between the TiN deposition film and the separator paper 4b. The capacitor element 1 further comprises a winding fastening tape 5 for retaining the wound state, an anode lead tab 6a and a cathode lead tab 6b respectively connected to the anode 2 and the cathode 3, and an anode lead wire 7a and a cathode lead wire 7b respectively connected to the anode lead tab 6a and the cathode lead tab 6b.

The capacitor element 1 is fabricated through the following processes. An aluminum foil is subjected to an etching process (electrolytic polishing process) and a formation process to prepare the anode 2. After preparing the anode 2, an anode lead tab 6a is provided on the anode 2. Also, an aluminum foil is subjected to an etching process to prepare the cathode 3. After preparing the cathode 3, a TiN deposition film, serving as the hard coating film 8, is formed on the surface of the cathode 3. Thereafter, the cathode lead tab 6b is provided on the cathode 3. The separator paper 4a, the anode 2, and the cathode 3 on which the separator paper 4b and the hard coating film 8 have been formed, are successively stacked, and thereafter, the stacked material is wound in a cylindrical form and fastened with the winding fastening tape 5. Subsequently, the wound stacked material is subjected to an edge formation and a heat treatment at 280° C. Then, the wound stacked material is immersed into a preparation solution in which 3,4-ethylenedioxythiophene has been mixed with an alcohol solution containing 40 mass % to 60 mass % of ferric p-toluenesulfonate (an oxidizing agent solution). Next, the wound stacked material is heated to thermal polymerize the 3,4-ethylenedioxythiophene. Thereby, the polythiophene-based conductive polymer layers (the solid electrolyte layers) are formed between the aluminum foil 2 and the separator paper 4b and between the hard coating film 8 and the separator paper 4b. Lastly, the anode lead wire 7a and the cathode lead wire 7b are connected respectively to the anode lead tab 6a and the cathode lead tab 6b.

The above-described capacitor element 1 has the following problems. Since the cathode 3 in which the titanium nitride deposition film has been formed as the hard coating film 8 undergoes stress, such as a stretching force or a twisting force, when winding the stacked material to form the capacitor element 1, cracks develop in the titanium nitride deposition film, resulting in an increase in leakage current of the capacitor element 1. In addition, when immersing the stacked material into the preparation solution to form the polythiophene-based conductive polymer layers as the solid electrolyte layers, the preparation solution corrodes the titanium nitride deposition film, resulting in an increase in leakage current of the capacitor element 1.

As a method for resolving the foregoing problems, there has been a proposal (see Patent Reference 1 below) to prevent the increase of the leakage current in the capacitor element resulting from the corrosion and cracks of the hard coating film by forming, in place of the hard coating film composed of a single metal compound, such as the TiN deposition film, a hard coating film composed of a composite metal compound such as titanium aluminum nitride (TiAlN) on the surface of the cathode.

Patent Reference 1: Japanese Published Unexamined Patent Application No. 2004-221512

DISCLOSURE OF THE INVENTION

Problems to be Solved by the Invention

When a hard coating film composed of a composite metal compound such as titanium aluminum nitride (TiAlN) is formed on the surface of the cathode, the hard coating film composed of the composite metal compound has a greater hardness than the hard coating film composed of a single metal compound. As a result, cracks do not develop in the hard coating film easily, and also, corrosion of the hard coating film does not occur easily. Thus, the leakage current of the capacitor element can be prevented from increasing.

Nevertheless, if the hardness of the hard coating film becomes greater, the hardness difference between the hard coating film and the aluminum foil that forms the cathode becomes greater than the hardness difference in the conventional capacitor. As a consequence, the adhesion between the cathode and the hard coating film becomes poor, and the hard coating film tends to be separated off from the cathode easily by the stress applied thereto during the winding step when forming the capacitor element. As a consequence, an increase in leakage current of the capacitor element can result.

Accordingly, the present invention has been proposed to solve the foregoing problems, and it is an object of the present invention to prevent, in a solid electrolytic capacitor having a hard coating film composed of a composite metal compound that is provided as the hard coating film formed on the cathode and in contact with a solid electrolyte layer, separation of the hard coating film and to prevent an increase of the leakage current associated with the separation.

Means for Solving the Problems

In order to accomplish the foregoing object, the present invention provides a solid electrolytic capacitor comprising a wound capacitor element comprising an anode, a cathode disposed opposite the anode and comprising aluminum, a hard coating film formed on a surface of the cathode, a separator provided between the hard coating film and the anode, solid electrolyte layers formed between the separator and the anode and between the separator and the hard coating film, the solid electrolytic capacitor characterized in that: the solid electrolytic capacitor further comprises an intermediate layer formed between the cathode and the hard coating film; the hard coating film comprises a compound of aluminum, titanium, and at least one nonmetallic element; and the intermediate layer contains at least one element selected from the group consisting of aluminum and titanium.

The "intermediate layer" may be a single film composed of one kind of substance (hereinafter also referred to as a "single-layer film"), a film in which the compositions of substances change along a film-forming direction (a direction perpendicular to the cathode surface) (hereinafter also referred to as a "varied substance film"), or a stack of a plurality of films composed of different substances from each other (hereinafter also referred to as a "multi-layered film"). The "hard coating film" is the topmost layer formed on the cathode and is in contact with the solid electrolyte layer.

The intermediate layer is composed of a substance that is different from that of the hard coating film. Herein, the term "a substance that is different from that of the hard coating film" means a substance that does not contain a particular element or particular elements among the plurality of kinds of elements that constitute the hard coating film, a substance that contains a different element from the plurality of kinds of elements that constitute the hard coating film, or a substance that contains only all the kinds of elements that constitute the hard coating film but in which the compositional ratio of the elements is different. When the intermediate layer is a varied substance film, it means that the substance that constitutes the intermediate layer in an arbitrary plane perpendicular to the film-forming direction is different from the substance that constitutes the hard coating film. When the intermediate layer is a multi-layered film, it means that each of the layers that constitute the multi-layered film is composed of a substance different from the substance that constitutes the hard coating film.

In the above-described configuration, the hard coating film is composed of a compound (composite metal compound) containing aluminum and titanium, and therefore it has a greater hardness than the intermediate layer. By interposing the intermediate layer containing at least one metallic element that constitutes the hard coating film between the hard coating film and the cathode, adhesion between the cathode and the hard coating film improves. As a result, the hard coating film is prevented from being separated from the cathode, and leakage current is prevented from increasing. It should be noted that the phrase "separation of the hard coating film from the cathode" may mean the separation between the cathode and the intermediate layer and the separation between the intermediate layer and the hard coating film.

The invention as set forth in claim 2 is characterized in that, in the invention as set forth in claim 1, the intermediate layer is a single-layer film composed of one kind of substance, and the hardness of the intermediate layer is less than the hardness of the hard coating film.

This configuration makes it possible to alleviate the stress applied to the hard coating film during the winding step in the manufacturing process by changes in the shape of the intermediate layer. Thereby, the separation of the hard coating film from the cathode can be prevented desirably.

The invention as set forth in claim 3 is characterized in that, in the invention as set forth in claim 1, the intermediate layer comprises a plurality of films composed of different substances from each other, and the hardness of each of the plurality of films is less than the hardness of the hard coating film.

This configuration makes it possible to alleviate the stress applied to the hard coating film during the winding step in stages by the shape changes of the plurality of films that constitute the intermediate layer. Therefore, the separation of the hard coating film from the cathode can be prevented more desirably without causing cracks in the intermediate layer.

The invention as set forth in claim 4 is characterized in that, in the invention as set forth in claim 3, the hardness of each of the plurality of films is greater than the hardness of the cathode but less than the hardness of the hard coating film, and the plurality of films are stacked so as to be in an ascending order of hardness from the cathode side toward the hard coating film side.

This configuration makes it possible to improve adhesion between the intermediate layer and the cathode, adhesion between the films within the intermediate layer, and adhesion between the intermediate layer and the hard coating film. Thereby, the separation of the hard coating film from the cathode can be prevented more desirably.

The invention as set forth in claim 5 is characterized in that, in the invention as set forth in claim 1, the compound that constitutes the hard coating film contains at least one nonmetallic element selected from the group consisting of carbon, nitrogen, boron, and oxygen.

With this configuration, the hard coating film is made of a substance with a high dielectric constant and a great hardness. Thereby, the capacity of the capacitor can be improved, and at the same time, corrosion of the hard coating film in the manufacturing process can be prevented.

The invention as set forth in claim 6 is characterized in that, in the invention as set forth in claim 1, the intermediate layer consists of aluminum, titanium, or a compound of at least one metallic element selected from the group consisting of aluminum and titanium and at least one nonmetallic element selected from the group consisting of carbon, nitrogen, boron, and oxygen.

With this construction, it is possible to improve the adhesion between the intermediate layer and the cathode and the adhesion between the intermediate layer and the hard coating film, and therefore, it is possible to prevent the separation of the hard coating film from the cathode desirably.

The invention as set forth in claim 7 is characterized in that, in the invention as set forth in claim 1, the intermediate layer is composed of only a portion of the plurality of elements that constitute the hard coating film.

In this configuration, the crystal lattice constant of the substance that constitutes the hard coating film and the crystal lattice constant of the substance that constitutes the intermediate layer are close to each other. Therefore, the binding forces between them at the interface become great, and the adhesion improves. Thereby, the separation of the hard coating film from the cathode can be prevented desirably. When the substance that constitutes the hard coating film is $Ti_{0.25}Al_{0.75}N$, an example of the above-described configuration is a case in which the substance that constitutes the intermediate layer is Al, Ti, AlN, TiN, or $Ti_{0.5}Al_{0.5}N$. When the intermediate layer is a multi-layered film and the substance that constitutes the hard coating film is, for example, $Ti_{0.25}Al_{0.75}N$, an illustrative example includes a case in which each of the substances that constitute the plurality of films of the intermediate layer is one of Al, Ti, AlN, TiN, and $Ti_{0.5}Al_{0.5}N$.

The invention as set forth in claim 8 is characterized in that, in the invention as set forth in claim 1, the compound that constitutes the hard coating film is titanium aluminum nitride.

This configuration makes it possible to prevent, for example, the cracks in the hard coating film desirably. Moreover, corrosion in the manufacturing process can be prevented desirably. The reason is that a greater hardness is obtained when the hard coating film is composed of titanium aluminum nitride than in the case of a compound with a nonmetallic element other than nitrogen.

The invention as set forth in claim 9 is characterized in that, in the invention as set forth in claim 8, the intermediate film is composed of titanium nitride.

This configuration makes it possible to prevent the separation of the hard coating film from the cathode more desirably. The reason is as follows. Since the hardness of the titanium nitride that constitutes the intermediate layer is less than the hardness of the titanium aluminum nitride that constitutes the hard coating film and the crystal lattice constant of the intermediate layer becomes close to the crystal lattice constant of the hard coating film, the stress to the hard coating film during the winding step can be alleviated by the intermediate layer. Moreover, the binding force between the intermediate layer and the hard coating film at the interface becomes great, and the adhesion improves.

The invention as set forth in claim 10 is characterized in that, in the invention as set forth in claim 1, the anode comprises one element selected from the group consisting of aluminum, tantalum, and niobium.

With this configuration, a high performance solid electrolytic capacitor is obtained since the anode is made of a valve metal.

The invention as set forth in claim 11 is characterized in that, in the invention as set forth in claim 1, the solid electrolyte layer comprises a polythiophene-based conductive polymer, a polyfuran-based conductive polymer, a polypyrrole-based conductive polymer, a polyaniline-based conductive polymer, or a TCNQ complex salt.

With this configuration, ESR characteristics (equivalent series resistance characteristics) improves since the conductivity of the solid electrolyte becomes higher. Therefore, a high performance solid electrolytic capacitor can be obtained.

Other Embodiments

[Anode]

The substance that forms the anode may be any valve metal. Examples of the valve metal include aluminum, tantalum, and niobium. It is preferable that the surface of the anode be roughened by, for example, an electrolytic polishing process or a chemical polishing process. The reason is that the capacity of the capacitor increases because the effective surface area increases in this case. In addition, the surface of the anode is subjected to a formation process such as anodic oxidation.

[Cathode]

It is preferable that the surface of the cathode be roughened by, for example, an electrolytic polishing process or a chemical polishing process. In this case, the effective surface area increases, and in addition, the anchoring effect obtained by the roughening improves adhesion between the cathode and the intermediate layer. Thereby, the separation of the hard coating film from the cathode can be prevented indirectly.

[Hard Coating Film]

It is preferable that the hard coating film be composed of a compound of a metal component that requires aluminum (Al) and titanium (Ti) as essential components, and one or more nonmetallic components selected from the group consisting of nitrogen (N), carbon (C), boron (B), and oxygen (O), and the hardness of the hard coating film be high. More preferable is a case in which the substance that constitutes the hard coating film is a nitride, a carbide, a carbonitride, a boride, a nitride-carbide, or a carbonitroxide of aluminum and titanium. Still more preferable is a case the substance that constitutes the hard coating film is titanium aluminum nitride. It should be noted that the compound that constitutes the hard coating film may contain a metallic element other than aluminum and titanium as a metallic component. Also, the compound that constitutes the hard coating film may contain a nonmetallic element other than nitrogen (N), carbon, boron, and oxygen as a nonmetallic component.

It is possible to employ such a method as a vacuum evaporation method, a PVD method, and a CVD method, as the formation method of the hard coating film. Examples of the PVD method include an ion plating method and a sputtering method. Examples of the CVD method include a thermal CVD method, a plasma CVD method, an optical CVD method, and a laser CVD method. It is preferable that the hard coating film be formed by a PVD method in order to form a hard coating film having a high atomic ratio of aluminum so that abrasion resistance and heat resistance can be enhanced. From the viewpoint of productivity also, it is preferable to form the hard coating film by a PVD method because the productivity can be improved. Still more preferable is a case in which an AIP (arc ion plating) method or a reactive sputtering method is adopted as the PVD method.

[Intermediate Layer]

In order to alleviate the stress during the winding step in the manufacturing process, it is preferable that the film thickness of the intermediate layer be 0.1 μm or greater, and more preferably 0.3 μm or greater. On the other hand, if the film thickness of the intermediate layer is too large, cracks tend to develop in the intermediate layer during the winding step of the capacitor element, and as a consequence, the capacitor cannot have a long lifetime. Therefore, it is preferable that the film thickness of the intermediate layer be 20 μm or less, and more preferably 10 μm or less.

The same formation method as in the case of the formation of the hard coating film may be used in the formation of the intermediate layer. When the intermediate layer is a multi-layered film, the respective films are successively stacked while varying film-formation conditions such as the film materials, the supply amounts of the film materials, film-formation temperatures, and film-formation speeds. When the intermediate layer is a varied substance film, the film-constituting elements are deposited successively while varying the film-formation conditions timewise.

[Solid Electrolyte Layer]

Preferable examples of the solid electrolyte include, but are not limited to, a polythiophene-based conductive polymer, a polyfuran-based conductive polymer, a polypyrrole-based conductive polymer, a polyaniline-based conductive polymer, and a TCNQ complex salt.

Advantages Of The Invention

According to the present invention, adhesion of the hard coating film to the aluminum foil that constitutes the cathode is improved, and thereby, the hard coating film is prevented from being separated. As a result, the leakage current of the capacitor element can be prevented from increasing. Moreover, higher capacity, lower LC, and higher heat resistance can be achieved in comparison with conventional solid electrolytic capacitors.

BEST MODE FOR CARRYING OUT THE INVENTION

Hereinbelow, the present invention is described in further detail based on certain embodiments and examples thereof. It should be construed, however, that the present invention is not limited to the following embodiments and examples, but various changes and modifications are possible without departing from the scope of the invention.

FIG. 1 is a schematic perspective view illustrating one example of the capacitor element in a solid electrolytic capacitor of the present invention, and FIG. 2 is a schematic cross-sectional view illustrating one example of the solid electrolytic capacitor of the present invention. FIG. 3 is a schematic cross-sectional view illustrating one example of the cathode side structure. FIG. 1 shows the wound capacitor element whose trailing end is unwound, for clearly illustrating the stack structure in the capacitor element. In the following, the solid electrolytic capacitor of the present invention will be described with reference to FIGS. 4 and 5.

The solid electrolytic capacitor of the present embodiment comprises, as illustrated in FIG. 2, an aluminum case 9, a capacitor element 1 disposed in the aluminum case 9, a sealing rubber packing 10 for sealing the capacitor element 1 within the aluminum case 9, a base plate 11 fixed to the aluminum case, for covering the top portion of the sealing rubber packing 10, and an anode terminal 12a and a cathode terminal 12b that are respectively connected to an anode lead tab 6a and a cathode lead tab 6b of the capacitor element 1 and are exposed over the top surface through the base plate.

As illustrated in FIG. 1, the capacitor element 1 comprises a separator 4a, an anode 2, a separator 4b, and a cathode-side stacked material 13. Solid electrolyte layers (not shown) are formed between the separator 4b and the anode 2 and between the separator 4b and the cathode-side stacked material 13, respectively. The capacitor element 1 is wound and is fastened by a winding fastening tape 5. As illustrated in FIGS. 1 and 3, the cathode-side stacked material 13 comprises a cathode 3, an intermediate layer 18 formed on a surface of the cathode 3, and a hard coating film 28 formed on a surface of the intermediate layer 18. The anode lead tab 6a is connected to the anode 2, and an anode lead wire 7a is connected to the anode lead tab 6a. On the other hand, the cathode lead tab 6b is connected to the cathode 3, and a cathode lead wire 7b is connected to the cathode lead tab 6b. The leading end portion of the anode lead wire 7a and the leading end portion of the cathode lead wire 7b are the anode terminal 12a and the cathode terminal 12b shown in FIG. 2, respectively.

The solid electrolytic capacitor of the present embodiment is fabricated through the following processes. An aluminum foil is subjected to an etching process (electrolytic polishing process) and a formation process to prepare an anode 2. After preparing the anode 2, an anode lead tab 6a is connected to the anode 2. Also, using an AIP method, a TiN film 18 (intermediate layer) having a film thickness of 0.5 μm, as illustrated in FIG. 3, is formed on a surface of a flat smooth aluminum foil 3 (cathode) that has not been subjected to an etching process (electrolytic polishing process). In addition, using an AIP method, a TiAlN film 28 (hard coating film) having a film thickness of 1 μm is formed on a surface of the TiN film 18, as illustrated in FIG. 3. Thereafter, the cathode lead tab 6b is connected to the flat smooth aluminum foil 3. A separator paper 4a, the anode 2, a separator paper 4b, and the cathode 3 on which the TiAlN film 28 and the TiN film 18 have been formed, are successively stacked, and thereafter, the stacked material is wound in a cylindrical form and fastened with a winding fastening tape 5. The wound stacked material is subjected to an edge formation and a heat treatment at 280° C. Then, the wound stacked material is immersed into a preparation solution prepared by mixing 3,4-ethylenedioxythiophene (monomer) with an ethyl alcohol solution of 60 mass % of ferric p-toluenesulfonate (an oxidizing agent solution). Thereafter, the wound stacked material is heated to thermal polymerize the 3,4-ethylenedioxythiophene. Thereby, polythiophene-based conductive polymer layers (not shown) serving as the solid electrolyte layers are formed between the aluminum foil 2 and the separator paper 4b and between the TiAlN film 19 and the separator paper 4b. Next, an anode lead wire 7a and a cathode lead wire 7b are connected respectively to the anode lead tab 6a and the cathode lead tab 6b.

Next, as illustrated in FIG. 2, a sealing rubber packing 10 is inserted in the capacitor element 1, and the capacitor element 1 is enclosed and fixed into an aluminum case 9. Thereafter, the opening of the aluminum case 9 is horizontally squeezed and curled to effect sealing, and an aging process is performed. Thereafter, a base plate 11 made of plastic is fitted to the curled surface of the capacitor element 1, and the anode lead wire 7a and the cathode lead wire 7b of the capacitor element 1 are subjected to a press-working process and a bending process, to form an anode terminal 12a and a cathode terminal 12b. The solid electrolytic capacitor is completed through the foregoing processes.

EXAMPLES

Example 1

20 samples of the solid electrolytic capacitor were fabricated in the same manner as described in the foregoing Best Mode for Carrying out the Invention. It should be noted that the solid electrolytic capacitor fabricated in this manner is hereinafter referred to as an "inventive capacitor A1." The inventive capacitor A1 has a rated voltage of 6.3 V and a rated capacity of 220 μF, and the outer shape thereof is a cylindrical shape having a diameter of 6.3 mm and a height of 6.0 mm. It should be noted that the solid electrolytic capacitors described in the following Examples 2 to 4 as well as Comparative Examples 1 and 2 have the same rated voltage, rated capacity, and outer shape as those of the inventive capacitor A1. In addition, 20 samples of the stacked material that had the same configuration as that of the cathode side stacked material used in the inventive capacitor A1 were fabricated separately. Here, the cathode side stacked material is a stacked material of a three-layered structure, which comprises a hard coating film, an intermediate layer, and a cathode.

Example 2

20 samples of the solid electrolytic capacitor were fabricated in the same manner as described in Example 1 above, except that an aluminum foil subjected to an electrolytic polishing process was used as the cathode. The solid electrolytic capacitor fabricated in this manner is hereinafter referred to as an "inventive capacitor A2." In addition, 20 samples of the stacked material that had the same configuration as that of the cathode side stacked material in the inventive capacitor A2 were fabricated separately.

Example 3

20 samples of the solid electrolytic capacitor were fabricated in the same manner as described in Example 1 above, except that an aluminum foil subjected to an electrolytic polishing process was used as the cathode, that a TiAlN film having a film thickness of 0.6 μm was formed as the hard coating film, and that titanium nitride (TiN) having a film thickness of 0.5 μm was formed as the intermediate layer. The solid electrolytic capacitor fabricated in this manner is hereinafter referred to as an "inventive capacitor A3." In addition, 20 samples of the stacked material that had the same configuration as that of the cathode side stacked material in the inventive capacitor A3 were fabricated separately.

Example 4

20 samples of the solid electrolytic capacitor were fabricated in the same manner as described in Example 1 above, except that an aluminum foil subjected to an electrolytic polishing process was used as the cathode, that a TiAlN film having a film thickness of 1 μm was formed as the hard coating film, and that titanium nitride (TiN) having a film thickness of 0.02 μm was formed as the intermediate layer. The solid electrolytic capacitor fabricated in this manner is hereinafter referred to as an "inventive capacitor A4." In addition, 20 samples of the stacked material that had the same configuration as that of the cathode side stacked material in the inventive capacitor A4 were fabricated separately.

Comparative Example 1

For comparison with Examples 1 to 4 above, 20 samples of the solid electrolytic capacitor were fabricated in the same manner as described in Example 1 above, except that no intermediate layer was formed. The solid electrolytic capacitor fabricated in this manner is hereinafter referred to as a "comparative capacitor X1." In addition, 20 samples of the stacked material that had the same configuration as that of the cathode side stacked material in the comparative capacitor X1 were fabricated separately. Unlike the inventive capacitors A1 to A4, the cathode side stacked material in the comparative capacitor X1 does not have an intermediate layer, and it is a stacked material having a two-layer structure comprising a hard coating film and a cathode.

Comparative Example 2

For comparison with Examples 1 to 4 above, 20 samples of the solid electrolytic capacitor were fabricated in the same manner as described in Example 1 above, except that an aluminum foil subjected to an electrolytic polishing process was used as the cathode, and that neither the intermediate layer nor the hard coating film was formed. The solid electrolytic capacitor fabricated in this manner is hereinafter referred to as a "comparative capacitor X2."

(Experiment)

As a measurement of the electrical properties, effective capacity (Cap), leakage current (LC), and capacity change ratio ($\Delta AC/C$) were measured for the inventive capacitors A1 to A4 and the comparative capacitors X1 and X2 under the following conditions. In the measurement of effective capacity (Cap), the capacity of each of the capacitors was measured while applying an alternating current with a frequency 120 Hz (hertz) thereto. In the measurement of leakage current (LC), each sample was set aside for 60 hours after applying a rated voltage thereto, and the leakage current was measured thereafter. The capacity change ratio is a percentage (%) obtained by the expression $(C_f-C_i)/C_i \times 100$, where the initial capacity is $C_i$ and the capacity at 1,000 hours after the application of the rated voltage is $C_f$. The measurement of capacity change ratio was carried out while the temperature of the capacitor was being kept at 105° C.

In addition, as a measurement of separation resistance characteristics, scratch test critical load was measured for the cathode side stacked materials having the same configurations as the cathode side stacked materials in the inventive capacitors A1 to A4 and the comparative capacitor X1. The term "scratch test critical load" refers to the minimum load at which the coating film is separated when conducting an operation (scratch test) in which, as illustrated in FIG. 4, a wedge-shaped diamond blade 14 is pressed against the cathode-side stacked material 13 and is dragged at a constant speed (2 mm/sec) with varying loads.

The results of the measurement are summarized in Table 1. The electrical characteristic values shown in Table 1 for the inventive capacitors A1 to A4 and the comparative capacitors X1 and X2 are the average values of 20 samples of each of the capacitors. Likewise, the separation resistance characteristics are also the average values of 20 samples of each of the cathode side stacked materials.

TABLE 1

|  | Electrolytic polishing process to cathode | Intermediate layer/ Film thickness | Hard coating film/ Film thickness | Cap (μF) | LC (μA) | ΔC/C (%) | Scratch test critical load (N) |
|---|---|---|---|---|---|---|---|
| Inventive capacitor A1 | No | TiN/ 0.5 μm | TiAlN/ 1 μm | 230 | 1.1 | −9.4 | 75.3 |
| Inventive capacitor A2 | Yes | TiN/ 0.5 μm | TiAlN/ 1 μm | 255 | 0.8 | −7.8 | 89.2 |
| Inventive capacitor A3 | Yes | TiN/ 0.5 μm | TiAlN/ 0.6 μm | 246 | 1.2 | −15.2 | 77.7 |

TABLE 1-continued

| | Electrolytic polishing process to cathode | Intermediate layer/ Film thickness | Hard coating film/ Film thickness | Cap (μF) | LC (μA) | ΔC/C (%) | Scratch test critical load (N) |
|---|---|---|---|---|---|---|---|
| Inventive capacitor A4 | Yes | TiN/ 0.02 μm | TiAlN/ 1 μm | 237 | 15 | −8.2 | 86.1 |
| Comparative Capacitor X1 | No | No | TiAlN/ 1 μm | 221 | 27 | −10.1 | 60.3 |
| Comparative Capacitor X2 | Yes | No | No | 104 | 55 | −11.2 | — |

As seen from the results of the critical load obtained by the scratch test, the inventive capacitors A1 to A4 exhibited improvements in adhesion of the hard coating film to the cathode over the comparative capacitor X1, which has no intermediate layer. Moreover, as seen from the results of the LC measurement, they were capable of reducing leakage current significantly.

Furthermore, when comparing the inventive capacitor A2 and the inventive capacitor A4 with each other, it is understood that the leakage current changes according to the film thickness of the intermediate layer, and that the stress during the winding step in the manufacturing process cannot be alleviated sufficiently by the intermediate layer when the film thickness of the intermediate layer is 0.02 μm. Therefore, it is preferable that the film thickness of the intermediate layer be 0.1 μm or greater.

Although the foregoing examples have illustrated the cases in which the substance that constitutes the hard coating film is TiAlN and the substance that constitutes the intermediate layer is TiN, it is possible to obtain the same advantageous with the use of other substances.

Although the foregoing examples have illustrated the cases in which the solid electrolyte layer is a polythiophene-based conductive polymer, it is possible to obtain the same advantageous effects with the use of other conductive polymers, such as polyfuran-based, polypyrrole-based, or polyaniline-based polymers.

Although the foregoing examples have illustrated the cases in which the anode is an aluminum foil, it is possible to obtain the same advantageous effects with the use of other metallic foils of valve metals, such as tantalum and niobium.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

INDUSTRIAL APPLICABILITY

The present invention is applicable to, for example, surface mounted electronic components in printed circuit boards of electronic appliances such as mobile telephones, notebook computers, and PDAs.

Figure 1:
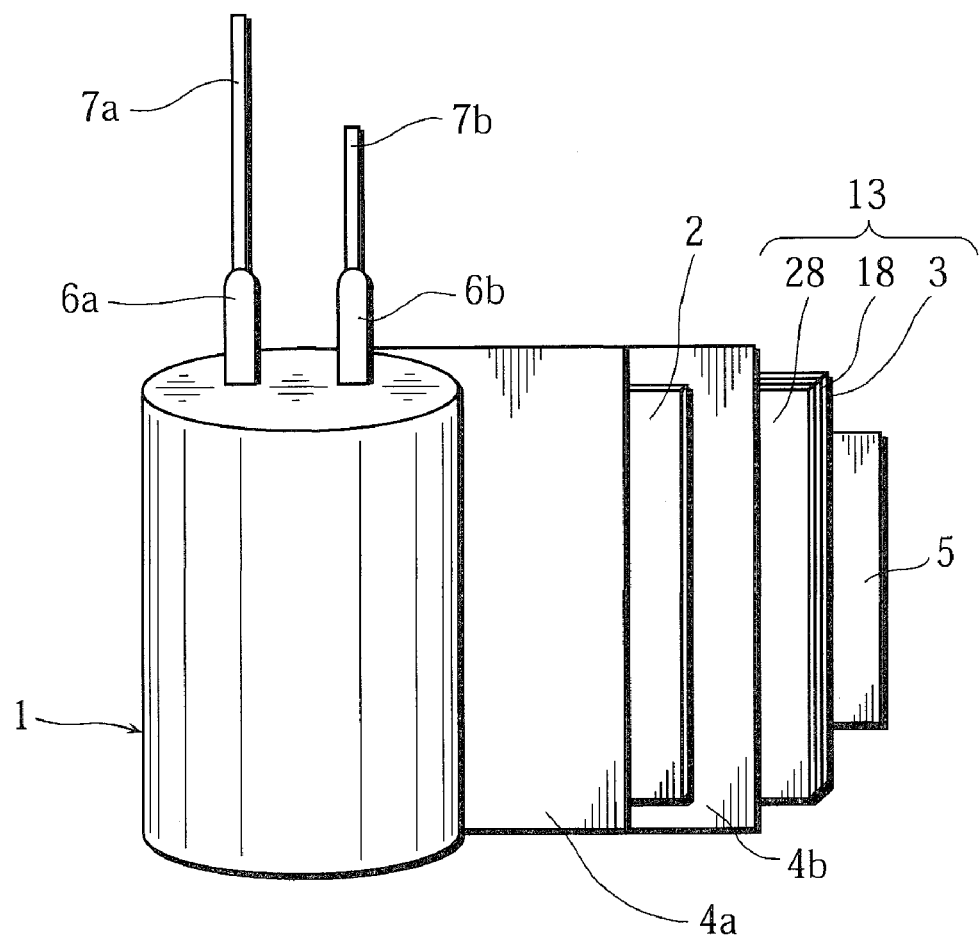
FIG. 1 is a perspective view schematically illustrating one example of a capacitor element of a solid electrolytic capacitor according to the present invention.
Figure 2:
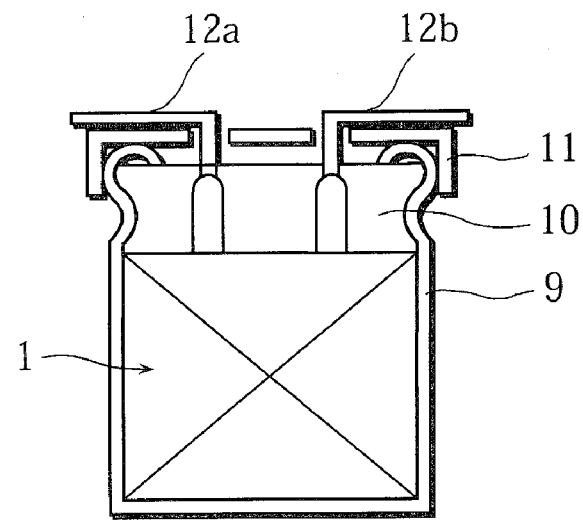
FIG. 2 is a cross-sectional view schematically illustrating one example of a solid electrolytic capacitor according to the present invention.
Figure 3:
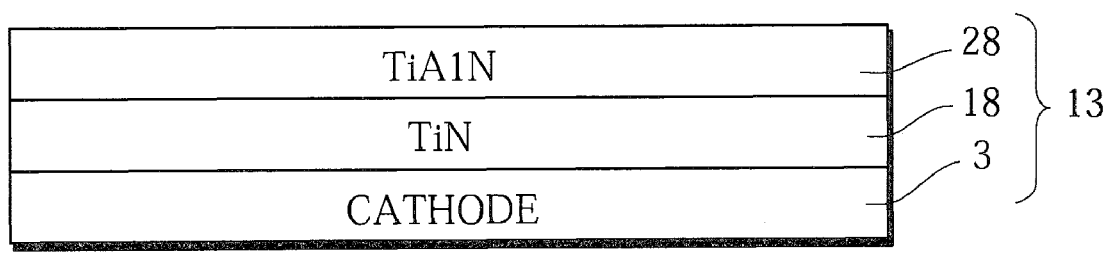
FIG. 3 is a schematic cross-sectional view illustrating one example of a cathode-side structure in a solid electrolytic capacity electrolytic capacitor according to the present invention.
Figure 4:
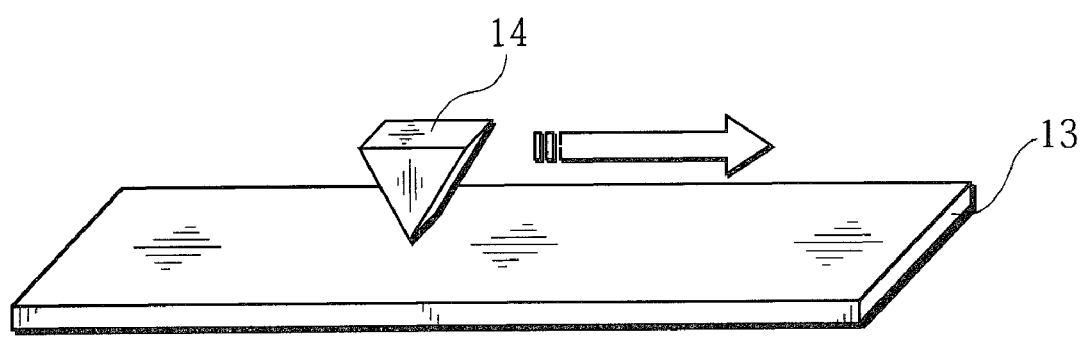
FIG. 4 is an illustrative view for illustrating a scratch test.
Figure 5:
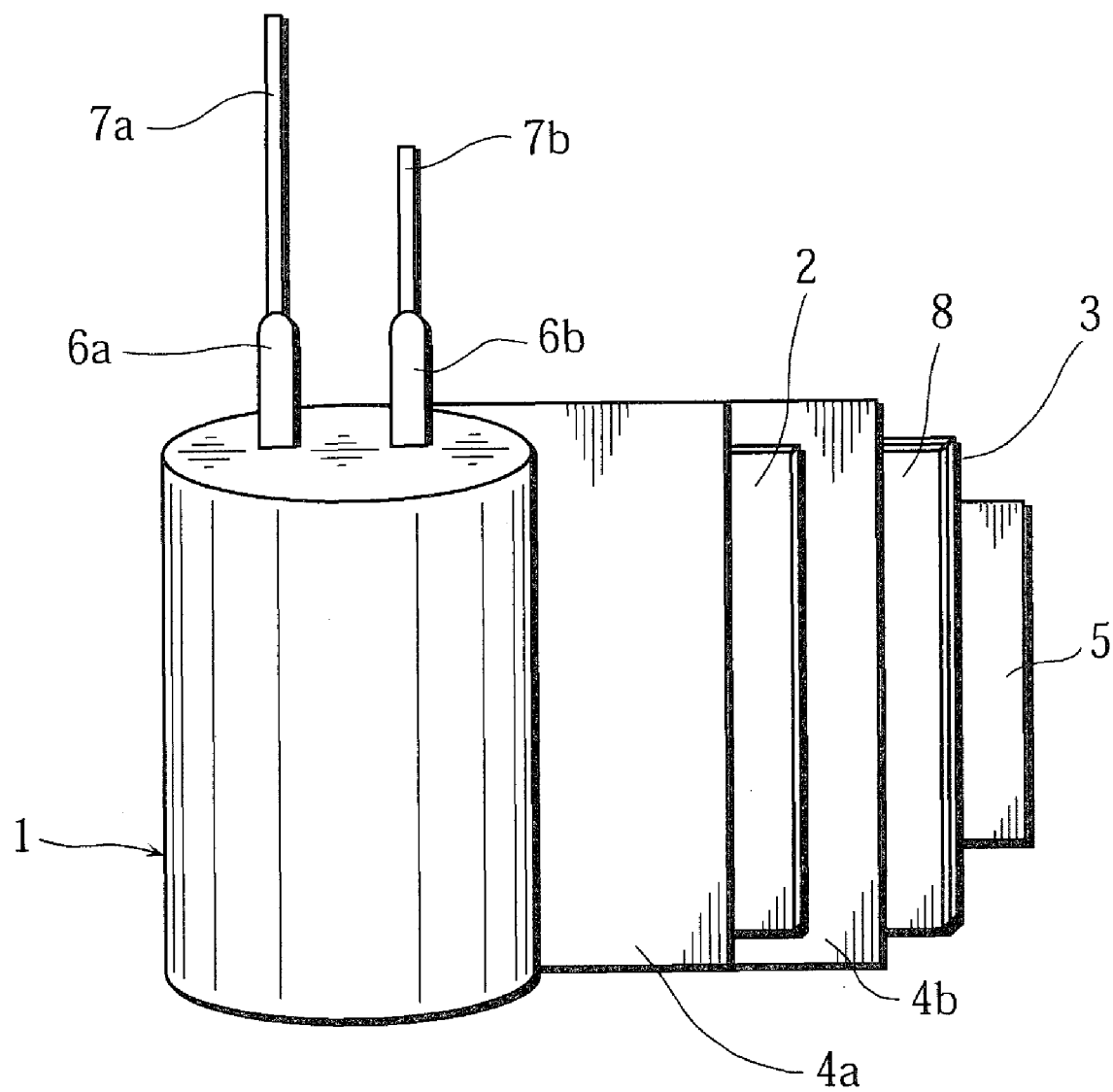
FIG. 5 is a perspective view schematically illustrating a capacitor element of a conventional solid electrolytic capacitor.

DESCRIPTION OF REFERENCE NUMERALS 1 capacitor element according to the present invention
2 aluminum foil (anode)
3 aluminum foil (cathode)
4a separator
4b separator
5 fastening tape
6a anode lead tab
6b cathode lead tab
7a anode lead wire
7b cathode lead wire
8 hard coating film
9 aluminum case
10 sealing rubber packing
11 base plate
12a anode terminal
12b cathode terminal
13 cathode structure
14 diamond blade
18 TiN film (intermediate layer)
28 TiAlN film (hard coating film)

The invention claimed is:

1. A solid electrolytic capacitor comprising a wound capacitor element comprising an anode, a cathode disposed opposite the anode and comprising aluminum, a hard coating film formed on a surface of the cathode, a separator provided between the hard coating film and the anode, solid electrolyte layers formed between the separator and the anode and between the separator and the hard coating film, the solid electrolytic capacitor characterized in that:

the solid electrolytic capacitor further comprises an intermediate layer formed between the cathode and the hard coating film; the hard coating film comprises a compound of aluminum, titanium, and at least one nonmetallic element; and the intermediate layer contains at least one element selected from the group consisting of aluminum and titanium.

2. The solid electrolytic capacitor according to claim 1, wherein the intermediate layer is a single-layer film composed of one kind of substance, and the hardness of the intermediate layer is less than the hardness of the hard coating film.

3. The solid electrolytic capacitor according to claim 1, wherein the intermediate layer is a multi-layered film comprising a plurality of films composed of different substances from each other, and the hardness of each of the plurality of films is less than the hardness of the hard coating film.

4. The solid electrolytic capacitor according to claim 3, wherein the hardness of each of the plurality of films is greater than the hardness of the cathode but less than the hardness of the hard coating film, and the plurality of films are stacked so as to be in an ascending order of hardness from the cathode side toward the hard coating film side.

5. The solid electrolytic capacitor according to claim 1, wherein the compound that constitutes the hard coating film contains at least one nonmetallic element selected from the group consisting of carbon, nitrogen, boron, and oxygen.

6. The solid electrolytic capacitor according to claim 5, wherein the compound that constitutes the hard coating film is titanium aluminum nitride.

7. The solid electrolytic capacitor according to claim 6, wherein the substance that constitutes the intermediate layer is titanium nitride.

8. The solid electrolytic capacitor according to claim 1, wherein the intermediate layer consists of aluminum, titanium, or a compound of at least one metallic element selected from the group consisting of aluminum and titanium and at least one nonmetallic element selected from the group consisting of carbon, nitrogen, boron, and oxygen.

9. The solid electrolytic capacitor according to claim 1, wherein the intermediate layer is composed of only a portion of the plurality of elements that constitute the hard coating film.

10. The solid electrolytic capacitor according to claim 1, wherein the anode comprises one element selected from the group consisting of aluminum, tantalum, and niobium.

11. The solid electrolytic capacitor according to claim 1, wherein the solid electrolyte layer comprises a polythiophene-based conductive polymer, a polyfuran-based conductive polymer, a polypyrrole-based conductive polymer, a polyaniline-based conductive polymer, or a TCNQ complex salt.

* * * * *